(12) United States Patent
Nielsen et al.

(10) Patent No.: US 6,174,229 B1
(45) Date of Patent: Jan. 16, 2001

(54) METHOD AND DEVICE FOR EVISCERATION OF CARCASSES

(75) Inventors: Jens Ulrich Nielsen, Bagsværd; Arne Druekær, Jægerspris, both of (DK)

(73) Assignee: Slagteriernes Forskningsinstitut, Roskilde (DK)

( * ) Notice: Under 35 U.S.C. 154(b), the term of this patent shall be extended for 0 days.

(21) Appl. No.: 09/196,294

(22) Filed: Nov. 19, 1998

(30) Foreign Application Priority Data

Jan. 20, 1998 (DK) .................................................. 0067/98
Apr. 3, 1998 (DK) .................................................. 470/98

(51) Int. Cl.⁷ ...................................................... A22B 5/00
(52) U.S. Cl. ........................ 452/106; 452/118; 452/134; 452/160
(58) Field of Search .................... 452/106, 118, 452/197, 160, 134

(56) References Cited

U.S. PATENT DOCUMENTS

| 2,508,957 | * | 5/1950 | Lynn | 452/118 |
| 4,653,150 | * | 3/1987 | Leining | 452/160 |
| 5,326,309 | * | 7/1994 | Buhot et al. | 452/118 |

FOREIGN PATENT DOCUMENTS

| 480802 | * | 12/1969 | (CH) | 452/160 |
| 63-1981 | | 6/1981 | (DK) . | |
| 0 601812 | | 6/1994 | (EP) . | |
| 0 755628 | | 1/1997 | (EP) . | |
| 0 856257 | | 8/1998 | (EP) . | |

* cited by examiner

*Primary Examiner*—Willis Little
(74) *Attorney, Agent, or Firm*—Tilton, Fallon, Lungmus & Chestnut (57) ABSTRACT

The invention relates to a method for the evisceration of carcasses conveyed on a slaughter line suspended in gambrels or hooks, where the abdomen and breast have been cut open, the hams divided and the fat end loosened, and wherein the carcass intestines are loosened, removed and placed on a gut pan or conveyor, the diaphragm is loosened and the plucks are removed and placed on a plucks conveyor. In loosening of the intestines, the connections of the intestines with the spinal column are broken, so that the intestines are made to hang out of the abdominal cavity. The diaphragm and leaf fat are loosened mechanically while the intestines are hanging out of the carcass and are connected to the plucks. The latter loosening is effected by a pressing device (5) and a hoop device (6) which can be moved independent of each other in the lengthways direction of the carcass. By means of the method, the intestines and plucks can be removed as a set of organs from the carcass and are subsequently separated, providing hygienic advantages. Alternatively separation may be carried out after the connection between the intestines and the plucks has been pulled out of the carcass and before the connection of the plucks with, for instance, the head, has been broken. The diaphragm and leaf fat are removed from the carcass along with the organs.

14 Claims, 9 Drawing Sheets

METHOD AND DEVICE FOR EVISCERATION OF CARCASSES

FIELD OF THE INVENTION

The present invention relates to a method and a device for evisceration of carcasses, such as pig carcasses, which are conveyed on a slaughter line suspended in gambrels or hooks, where the abdomen and breast have been cut open, the hams divided and the fat end loosened. The invention also relates to a tool for loosening the diaphragm and leaf fat, a tool and a method for cutting through the connections of the diaphragm and the intestines with the spinal column and a tool, device and method for pre-cutting the tenderloin.

BACKGROUND OF THE INVENTION

The evisceration of pig carcasses is effected in a number of sub-processes, normally carried out by abattoir, i.e., slaughterhouse, workers. Certain of the sub-processes such as fat end loosening, brisket opening, and loosening of the diaphragm and leaf fat can be performed by various automatic or worker-operated devices.

Thus, in several abattoirs, worker-operated equipment is used to loosen diaphragm and leaf fat. The equipment, which is manufactured and marketed by Scanio, Denmark, includes a larger and a smaller hoop, which can be moved past each other by means of two pendulum-suspended cylinder units. After the intestines have been removed from the carcass, the operator makes a cut in the diaphragm muscle and positions the larger hoop under the diaphragm. The smaller hoop is moved down to meet the upper side of the diaphragm, and then the larger hoop is moved upwards in the direction of the pelvic region of the carcass. This movement loosens the diaphragm and leaf fat from the carcass. The design of the loosening equipment is shown in Danish design registration no. 63-1981 (owned by Slagteriernes Forsknings-institut the owner of the present application).

EP-A2 0 601 812 (University of Bristol) describes a method for removing viscera from pig carcasses. The carcass is cut open at the abdomen and breast. Then, the fat end is loosened. A cutting tool with two collecting fingers is next moved along the spinal column, cutting free the intestines which fall away through the abdominal opening. The tool provides an opening in the diaphragm, through which vertical knives are inserted and moved round the inside of the carcass cutting out the diaphragm. A brush device tears out the lungs of the carcass, and finally the head is cut off. Leaf fat is not loosened or extracted.

EP-A1 0 755 628 (Stork R. M. S.) describes a method for automatic releasing the intestines by means of half-hoops shaped to follow the inside of the carcass. In operative position the half-hoops practically connect to each other. The hoops are placed between the peritoneum and the abdominal wall and are moved parallel to the spinal column whereby the peritoneum with the organs arranged therein is released. The purpose of the method is to release the peritoneum almost completely from the abdominal wall with a single releasing movement. (However, the present applicant has not been able to reproduce this situation.)

Danish patent application no. 120/97, filed on Feb. 3, 1997 (also owned by Slagteriernes Forsknings-institut) describes a method for the evisceration of a carcass which is suspended in a gambrel and has been cut open in the abdominal side. In this method, the diaphragm, leaf fat and intestines are loosened. The diaphragm and leaf fat are preferably loosened by means of a set of half-hoops, the free ends of which are at a substantial distance from each other, such as a set of hoops of the design known from the loosener according to the above mentioned Danish design registration. The connections between the intestines and the spinal column are cut through by the action of a cutting tool moving along the spinal column.

SUMMARY OF THE INVENTION

The object of the present invention is to provide a method which will permit mechanical loosening of leaf fat and diaphragm and the removal of the intestines and at least a part of the plucks in one piece from the carcass, whereby the need for manpower and heavy work is reduced and better hygiene is achieved than in traditional organ removal (in which the connection between the plucks and intestines is cut through inside the carcass). The method should permit much the same products to be produced as in a traditional process (i.e. a "cleaned" carcass, plucks, intestines, etc.). Existing transport systems for intestines and plucks should preferably be capable of incorporation in the process.

The method according to the invention, wherein the intestines of the carcass are loosened, removed and placed on a gut pan or conveyor, the diaphragm is loosened and the plucks are removed and placed on a plucks conveyor, is characterised in that the connections between the intestines and the spinal column are broken so that the intestines are made to hang out of the abdominal cavity, and further, the diaphragm and leaf fat are mechanically loosened while the intestines are hanging out of the abdominal cavity and are connected to the plucks, the loosening being effected by means of a pressing device and a hoop device which can be moved independently of each other in the lengthways direction of the carcass.

In the method according to the invention the diaphragm and leaf fat are loosened without a need for cutting free and removal of the intestines as such from the carcass. Intestines and plucks can thus be removed as a single set of organs from the carcass for subsequent separation, or separation can be performed after the connection between the intestines and plucks has been pulled out of the carcass but before the connection of the plucks to, for instance, the head has been broken. It is an advantage of the method according to the invention that the diaphragm and leaf fat are removed from the carcass along with the organs.

After loosening of the diaphragm and leaf fat, the intestines and at least a part of the plucks connected to the intestines may thus be removed in one piece after being cut free from the carcass. Cutting free may be effected by 1) cutting through the trachea and oesophagus, 2) cutting free the tongue, or 3) cutting through the connection between the liver plucks and the tongue plucks, i.e. cutting through the oesophagus etc. at the level of the lungs.

Under option 1) the intestines and whole plucks are removed. The tongue remains behind in the carcass and may be removed in a subsequent manual operation. The cutting through of the trachea and oesophagus may be done before, during or after the organs attached to these tubes are loosened or freed from the inside of the carcass. Under option 2) the intestines and the whole plucks with tongue are removed. Under option 3) the intestines and only a part of the plucks are removed. The tongue plucks remain in the carcass, but can be easily removed in a subsequent manual operation, as the operator has easy access for cutting out the tongue.

In the present description the term "liver plucks" are preferably to be understood as the liver, diaphragm, leaf fat and kidneys. The term "tongue plucks" are preferably to be understood as the tongue, lungs and heart.

In connection with the removal of the intestines and plucks/liver plucks, the intestines are preferably supported by a gut pan or conveyor placed under the carcass abdomen.

When the intestines are extracted from the carcass onto a gut pan or conveyor belt, their connection with the plucks (i.e. with the whole plucks with or without tongue, or with the liver plucks) are preferably maintained, and the intestines and attached plucks are not separated until the connection between the plucks and the intestines is outside the carcass.

For loosening of the diaphragm and leaf fat, a hoop device is used which in its working position preferably has a gap at the breast opening of the carcass of such a size as to allow the passage of protruding intestines.

The position of the hollows of the fore legs/fore trotters of the carcass are preferably measured and one or more tools automatically placed in their initial and/or work positions on the basis of this measurement. Before the hoop device is inserted below the carcass diaphragm, it is preferably positioned in dependence on this measurement.

A pan may be arranged to lift protruding intestines away from the breast opening before the hoop device is inserted into the carcass under the diaphragm.

The hoop device is preferably designed to loosen the kidneys from the spinal column as it loosens the leaf fat.

The connections of the intestines and the diaphragm with the spinal column are preferably broken mechanically by means of a tool moving along the spinal column. The connections of the diaphragm and the intestines with the spinal column may be cut through by means of a tool which is substantially in the shape of a pair of tongs with closable jaws with cutting edges on the inwardly-directed sides of the jaws and a point or sharp edge on the outer edges, and which in opened position and with the jaws foremost is moved down along the spinal column to and through the diaphragm part of the carcass, whereupon the jaws are closed and the tool raised along the spinal column, thus cutting through the diaphragm part next to the spinal column and also the connections of the intestines with the spinal column.

In connection with the loosening processes, the tenderloin may also be pre-cut by means of a profiled knife moving along the spinal column to cut through the connections of the tenderloin to the spinal column. The tenderloin may subsequently easily be pulled out by an operator.

The tenderloin is preferably pre-cut by the knife being inserted against the spinal column of the carcass until it has cut into the fleshy and connective tissue on two sides of the spinal column, whereafter the knife is moved along the spinal column in the direction of the carcass head, while being pressed resiliently or yielding against the spinal column until the tenderloin is pre-cut.

The device according to the invention for the evisceration of carcasses comprises a first tool arranged to break the connections between the intestines and the spinal column, so that the intestines are made to hang out of the abdominal cavity, and a second tool arranged to loosen the diaphragm and leaf fat while the intestines are hanging out of the carcass and are connected to the plucks, the tool comprising a pressing device and a hoop device which can be moved independently of each other in the lengthways direction of the carcass.

The hoop device in its work position has preferably a gap at the breast opening of such a size as to permit the passage of protruding intestines.

The device may comprise a lifting device with a pan designed to lift the protruding intestines away from the breast opening before the hoop device is inserted into the carcass below the diaphragm.

The first tool of the device designed to break the connections of the intestines with the spinal column may substantially have the form of a pair of tongs with closable jaws, on which the inwardly directed sides may have cutting edges, while the outside has a point or cutting edge.

The device may also include a tool arranged to pre-cut the tenderloin in the carcass, and which has a knife with a profiled blade.

In particular, the device may include an arrangement for pre-cutting the tenderloin in a carcass which has a knife with a profiled blade, a knife holder with a drive unit by means of which the knife may be moved between an advanced and a retracted position in relation to the holder, said drive unit actuating the knife resiliently or yielding against the spinal column in its advanced position and a device linked to the holder which is arranged to move the tool consisting of the knife and holder in a substantially vertical direction.

The device may also include a measuring device designed to automatically determine the position of the hollows of the carcass fore legs/fore trotters ("arm-pits") and to set the level of operating machines on the basis of the determinations. The measuring device may include e.g. sensor arms, linked to a position indicator and moved automatically towards and down the abdomen of the carcass, the sensor arms being arranged to send a signal to register the current signal of the position indicator at the moment the sensor arms in their movement down the carcass come into contact with the hollows of the carcass fore legs/fore trotters.

The tool according to the invention for loosening the diaphragm and leaf fat during the evisceration of carcasses comprises a hoop device designed for insertion in the carcass breast opening, which device at the breast opening has a gap of such a size as to permit the passage of protruding intestines, and that it has a pressing device working in concert with the hoop device, which pressing device can be moved independently of the hoop device in the lengthways direction of the carcass.

The gap is preferably between 3 and 20 cm, and particularly between 4 and 10 cm.

The hoop device preferably comprises two knives which in their work position are designed to make a pre-cut in the diaphragm muscle of the carcass at the breast opening.

The tool according to the invention for cutting through the connections of the diaphragm and intestines with the spinal column in the carcasses has mainly the form of a pair of tongs with closable jaws, that the inwardly directed sides of the jaws have cutting edges and that the jaws of the tongs on their outside have a point or sharp edge. The cutting edges of the inwardly directed sides will preferably form a "V" in the closed state of the jaws.

A drive unit may be arranged to move the legs of the tongs between an open position in which the jaws are at a distance to each other and a closed position in which the jaws are together.

The method according to the invention for cutting through the connections of the diaphragm and intestines with the spinal column in carcasses including moving a tool, in the form of a pair of tongs with closable jaws which has cutting edges on the inwardly directed sides of the jaws and a point or sharp edge on the outside, in open state with the jaws foremost down to and through the diaphragm part of the carcass adjacent to the spinal column, closing the jaws of the tool, and then moving the tool up along the spinal column, whereby the diaphragm part adjacent to the spinal column and the connections between the intestines and the spinal column are cut through by the tool.

The tool according to the invention for pre-cutting the tenderloin in a carcass comprises a knife with a profiled blade.

The tool may further comprise a holder which has a drive unit connected to the knife by means of which the knife can be moved between an advanced and a retracted position in relation to the holder, the unit being resilient or yielding in the advanced position of the knife. The knife may be fixed to the holder by means of a hinge part and the drive unit may be mounted between the holder and the knife at a distance from the hinge part.

The blade is preferably bent at an angle, or at the least the central part of the blade may be curved, preferably as a circular arc.

The holder preferably has a stop face arranged in front of the knife seen in its direction of movement when pre-cutting the tenderloin from the spinal column.

Preferably the holder has a contact face arranged in front of the knife and lying substantially perpendicular to the knife's direction of movement during pre-cutting.

The device according to the invention for pre-cutting the tenderloin of carcasses comprises a knife with a profiled blade, a knife holder with a drive unit by means of which the knife can be moved between an advanced and a retracted position in relation to the holder, the unit being resilient or yielding in the advanced position of the knife, and a device attached to the holder which is arranged to move the tool comprising the knife and holder in a mainly vertical direction.

The device may be arranged to halt its movement in the mainly vertical direction when the tool moving in the vertical direction meets an obstruction excerting a greater reaction force than its pre-cutting force (i.e. when it meets the diaphragm).

The method according to the invention for pre-cutting the tenderloin of carcasses includes moving a knife with a profiled blade in against the spinal column of the carcass until it has cut into the fleshy and connective tissue on two sides of the spinal column, moving the knife along the spinal column in the direction of the carcass head, while being pressed against the spinal column in a resilient or yielding way, and continuing that movement along the spinal column until the tenderloin is pre-cut.

The knife may be moved while mounted on a holder with a stop face, and the movement along the spinal column may continue until the stop face meets resistance from the carcass diaphragm.

The knife may be moved to its retracted position after pre-cutting and in its retracted position continue its movement along the spinal column while tools carries out processing operations on the carcass viscera.

Pre-cutting of the tenderloin is preferably started after the intestines have been loosened from the carcass spinal column and are hanging out of the abdominal cavity.

A preferred embodiment of the method consists of the diaphragm and leaf fat of the carcass being loosened directly after the knife has concluded pre-cutting along the spinal column. To carry out the loosening a hoop device is preferably used with an internal diameter sufficiently large to permit the hoop device to pass the knife and associated pressing device when the hoop device is moved up to the rear end of the carcass.

The invention is mainly described in connection with the evisceration of pig carcasses. The invention may however be applied to carcasses from other animals, such as cattle (including cows, heifers, calves and bulls), sheep and goats.

The invention is described in detail in the following with reference to the drawings in which.

BRIEF DESCRIPTION OF THE DRAWINGS

EXAMPLE 1
Traditional Evisceration

DESCRIPTION OF THE PREFERRED EMBODIMENT

This example describes the usual method used for eviscerating pig carcasses. The carcasses are conveyed on a slaughtering line, passing different, manned work stations.

The abdomen of the carcass is cut open manually by means of a knife. The opening starts with a cutting through rind and fat from the highest point between the hams and down to the breastbone, but without cutting through the inner part of the abdominal wall. The cut must follow the centre line of the abdomen exactly.

The genitals are cut off and then the abdominal wall itself is opened by a cut that runs from a point 10–15 cm below the hams and up between these.

The ham muscles can now be divided by a cut precisely in the middle.

The pubic bone is separated without damaging the underlying fat end, and the abdominal wall is cut through down to the breastbone.

After the bladder has been cut free, the intestines are turned out.

The fat end is cut free by means of a fat end loosener. The central part of the loosener is inserted into the fat end and a circular cut is made round the fat end. After the fat end has been cut free, it is extracted from the pelvic cavity while remaining in the hollow knife of the loosener, the intestines being pulled partially free from the spinal column. A plastic bag is put on in the fat end to prevent the feces from escaping.

The intestines are cut free. With one hand the operator tilts the stomach out of the abdominal cavity and cuts through the oesophagus near the stomach. The intestines are now free and can be placed in a gut pan for inspection and further processing.

The subsequent opening of the thoracic cavity may include manual pre-cutting of chest and neck and sawing of the breastbone. This operation can also be performed by means of a specially designed machine.

By the manual chest opening operation the fat and meat above the breastbone are cut through to the tip of the cartilage on the first joint of the bone. Scoring is made from here to the stick wound. The neck is cut through from stick wound to the angle of the jaws, where a cut is made through the layer of fat. From the stick wound a cut is made upwards through the cartilage to the first joint of the breastbone. A sawing operation is then made through the first joint and upwards.

The leaf fat and diaphragm are then loosened in the following way: The leaf fat is lifted to reveal the diaphragm, and a 4–5 cm long cut is made into this on either side, as close to the chest and abdominal wall as possible. The gall bladder is pulled from the liver. Leaf fat and diaphragm are released in one operation by the operator making an upwards breaking movement with his right and left arms. Alternatively, a specially designed machine can be used (diaphragm and leaf fat loosener mechanical of Scanio, Denmark).

The leaf fat is separated from the diaphragm.

The plucks are now extracted from the thoracic cavity, right down to the root of the tongue. (The plucks may include tongue, throat, oesophagus, heart, lungs, diaphragm, liver and kidneys.)

The tongue is cut free from the carcass by means of a cut on either side of the tongue on the outer side of the hyoid bone, after which the tongue is cut completely free from the jaw, and a cut is made across the underside. The plucks are now free and suspended on a hook which is transported by a plucks conveyor. The plucks are moved on for veterinary inspection and further processing.

The evisceration of the carcass has now been completed. These working operations involve 11 operators at a slaughtering rate of 320 carcasses per hour.

The carcass is moved on along the slaughter line to be split in halves and divided into cuts.

EXAMPLE 2

Mechanical Evisceration

This example describes working operations in mechanical evisceration according to one embodiment of the invention. The removal of the organs is undertaken at one work station which is installed on a slaughtering line for pig carcasses.

Figure 1:
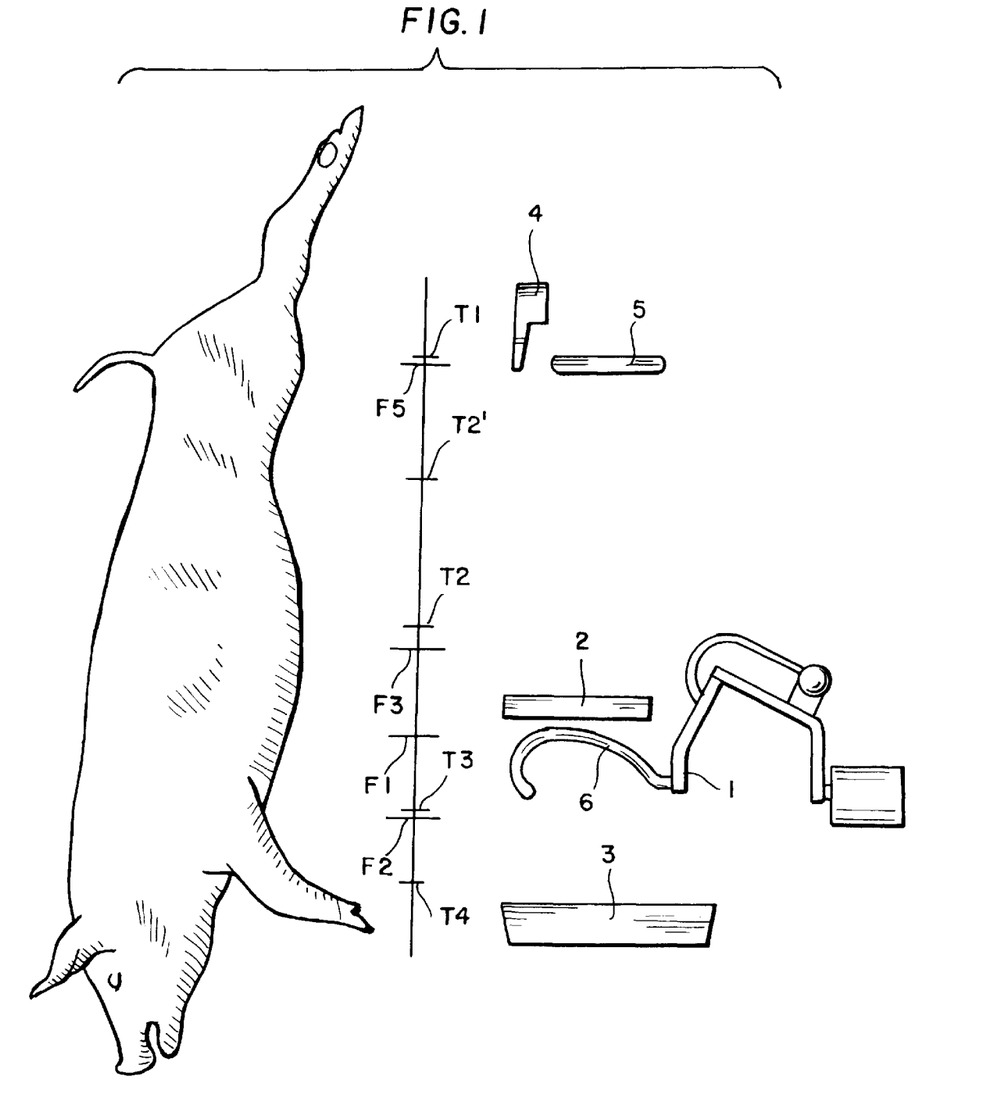
FIG. 1 shows the essential tools in a device for automatic removal of organs from a pig carcass in a work station and the height positions of the tools in the various work phases, all in diagrammatic representation.

The work station includes various tools, shown schematically on FIG. 1 by reference numbers 1 to 5. By means of arrangements not shown, the tools can be moved between the various rest, waiting and working positions. The arrangements can move the tools vertically and horizontally in mainly translatory movements.

Reference no. 1 designates a tool for loosening diaphragm and leaf fat. A shovel-shaped pan 2 serves to lift protruding intestines when hoops of the loosening tool 1 are inserted in the carcass. A conveyor or gut pan 3 has the purpose of catching the set of organs when after loosening and cutting free it falls out of the carcass breast and abdominal opening. There is also a cutting tool 4 for cutting through the connections of the intestines and diaphragm with the spinal column and a tool 5 with a holding hoop or plate for interacting with the loosening tool 1 when loosening the diaphragm.

Figure 2:
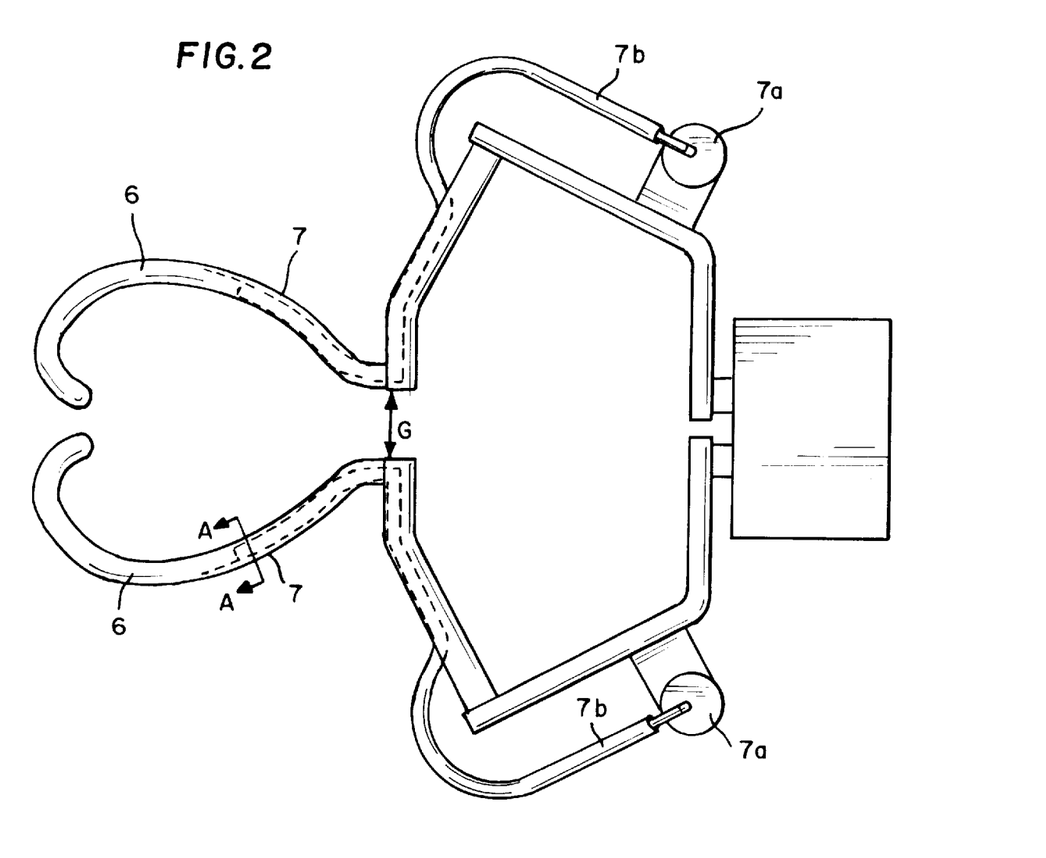
FIG. 2 shows a tool used in the device of FIG. 1 with a set of hoops for loosening the diaphragm and leaf fat.

The design of loosening tool 1 is shown in more detail in FIG. 2. It comprises two half-hoops 6, which are substantially shaped to follow the inside of the carcass. The tips are curved inwards towards the center and are at a substantial distance from each other in order to avoid damaging the tenderloin. The half-hoops are set at a mutual distance of such a size that the protruding intestines can easily pass through gap "G", when the hoops are moved upwards in the carcass. To the right of gap "G" in the working position shown the tool forms a kind of ring through which protruding organs (intestines) can fall down onto the gut pan below. The tool has a holder for the half-hoops which serves to turn the half-hoops between an insertion position in which the planes of the hoops are parallel and a working position, in which the hoops lie in the same plane.

Figure 3:
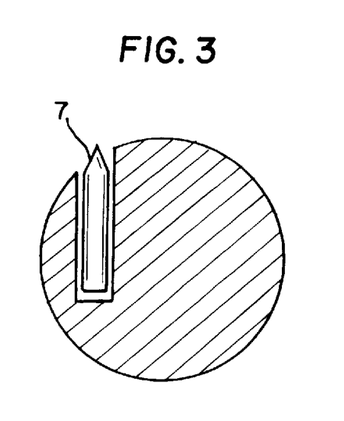
FIG. 3 shows a cross-section through one of the hoops along the line A—A in FIG. 2.

In each of the hoops is mounted a knife 7 moving forwards and backwards in the part of the hoop which in working position lies adjacent to the diaphragm muscle, immediately within the breast opening. The knives are arranged slightly offset from the center of the hoop rod, so that the top of the hoop forms a fence which prevents cutting into the leaf fat (FIG. 3).

The forwards and backwards motion of the knives is obtained by two motors 7a with eccentrically mounted rods 7b to transfer the motor power to the knives. The knives can be retracted into the hoop rod by means of a cylinder when there is no need for them.

Before a carcass enters the work station for evisceration, several measurement and processing tasks are carried out on the carcass:

The position of one or more anatomical points on the carcass is determined automatically in a measuring station, whereby the distance between the slaughter line conveyor rail and the tools of the work station can be adjusted to the individual carcass. For example, the position of the armpits in relation to the conveyor rail can be determined by equipment described in example 3.

After measurement the carcass is moved to a position in which the abdomen is opened, the fat end loosened and the breast cut open. These operations can be carried out in the traditional manner by operatives. They are preferably to be carried out by means of well-tried fully or semi-automatic equipment available on the market, such as that supplied by Automeat and Stork. After the opening of the abdomen, the intestines are not turned out as in the traditional process. Instead, the intestines are allowed to fall out through the abdominal and breast opening under their own weight until halted by the connections with the spinal column and diaphragm.

After these preliminary operations, the carcass is moved to the work station for evisceration and brought to a stop.

Initially, the loosening tool 1 and the pan 2 are in rest position, in which the tools are retracted from the carcass and are positioned at level F1 (FIG. 1), with the pan 2 directly over the half-hoops 6, which are turned so as to be in parallel planes.

The tool 1 and pan 2 are now moved to level F2, which lies just under F1. The pan is then moved in towards the carcass, and when its front edge reaches the surface of the carcass the movement is halted and the pan and tool raised to level F3. In so doing, the pan 2 pushes protruding organs (intestines) away from the area of the breast opening in which the half hoops are to be inserted. Level F3 is determined on the basis of measured values of the distance of the armpits from the conveyor rail and may thus vary from carcass to carcass.

A gripper tool is activated to move in and grip the edges of the breast opening and pull them apart in order to enlarge the breast opening. The tool holds the edges firmly during the following operations.

The half-hoops 6 which are located immediately below the diaphragm are inserted into the carcass until they meet the carcass wall near the spine.

The gut pan 3 is in receiving position a little below the level of the diaphragm.

The half-hoops 6 are turned to lie in the same plane, as shown in FIG. 2.

Cutting tool 4 and the holding tool 5 are at level T1 when at rest. They are in their furthest position from the carcass. Tool 4 is preferably of the design shown in FIG. 6, described in greater detail in example 4. It includes a tong-shaped gripper with cutting edges on its inner sides. The gripper is moved towards the carcass spinal column and in open position now begins a downwards movement along the spine, gathering the connections of the intestines with the spinal column in the mouth of the tongs. Once the tool has proceeded through the diaphragm to a position determined by the measurement, it closes and is pulled up, thus cutting through the diaphragm parts at the spinal column and the connections of the latter with the intestines. Finally the intestines fall out of the carcass breast and abdominal openings. The tool is retracted to its starting position at level T1.

Figure 4:
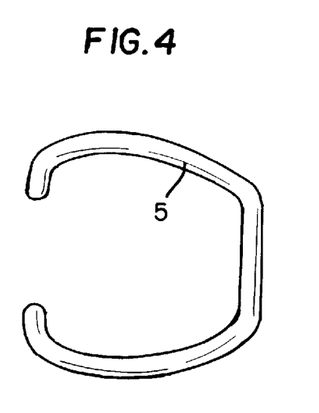
FIG. 4 shows a holding hoop.

The tool 5 is inserted into the abdominal opening of the carcass and moved down to level T2. The tool 5 may correspond to the holding hoop in the loosener shown in Danish design registration no. 63-1981, see FIG. 4, but may also be in the form of a plate or have some other form suitable for holding down during leaf fat loosening. At position T2, the holding tool 5 is positioned substantially over the diaphragm, where the movement comes to an automatic halt when the reaction force of the diaphragm and organs has become sufficiently great. The device which procures the vertical movement of the tool can only exert a certain vertical power or is arranged to halt its movement when resistance exceeds a threshold value.

The forwards and backwards motion of the knives 7 in the half-hoops 6 is now activated, while at the same time the tool 1 is moved upwards. In so doing, a pre-cut is made in the diaphragm, so that the diaphragm muscle is cut in the region of the breast bone without the leaf fat being cut through. The knives are then retracted into the hoops into their inactive position.

The pan 2 is then retracted from the carcass into its furthest position, so that the ring opening of the tool 1 outside the carcass becomes accessible to the intestines and other protruding organs.

The set of hoops 6 continues its upwards movement past the mainly stationary holding hoop 5, thus loosening the diaphragm. The set of hoops continues up along the inside of the carcass and up between the hams completely loosening the leaf fat and kidneys from the inside of the carcass. The gap G and the tool's ring opening enable the tool to pass the protruding intestines without dragging them up. Finally level F5 is reached at the pubic bone of the carcass, where movement halts. The half-hoops 6 are then pulled out of the carcass and moved away together with the pan 2 for desinfection. During desinfection the loosening tool 1 and pan 2 are moved back to starting position F1.

After the loosening of the diaphragm, the tool 5 is lowered, pulling free the lungs etc. from the inside of the carcass. The movement ceases at level T3, after which the tool is moved horizontally outwards, thus pulling out the lungs etc. The tool then returns to its rest or starting position at level T1.

Obviously, these operations may be carried out wholly or partially in parallel, and may be performed as smooth movements without pauses between the different work stages.

The leaf fat, intestines and plucks have now been loosened and cut free from the inside of the carcass, apart from the attachment at the trachea and esophagus. Further removal of organs may be carried out in different ways, either manually or mechanically. The separation of the intestines and plucks may be carried out while they are both still attached to the carcass by the trachea and oesophagus or after the connection with the carcass has been broken (but carried out only when the connection between the intestines and the plucks has been brought outside carcass).

The following describes an embodiment whereby the trachea and esophagus are cut through and the set of organs extracted automatically using a tool described in greater detail in example 6 but not shown in FIG. 1. The tool comprises a gripper and a cutting device. The gripper is moved to level T4 and enters the breast opening a little above the larynx, closing round the trachea and oesophagus so as to be able to slide along them. The gripper is then moved downwards. Its aperture is less than the thickened part at the larynx, so its motion is halted at the larynx, for example by a switch which shuts down the motor unit. The cutting device is inserted into the carcass and cuts through the larynx and oesophagus. The gripper moves the cut ends of the trachea and oesophagus in the direction of the gut pan, thus pulling out the last part of the plucks from the carcass. The device suspends the end with the cut-through larynx and oesophagus on a hook of the plucks conveyor. The organs are now completely free of the carcass. The intestines, leaf fat etc., are resting on the gut pan, while the plucks are held at one end by the hook of the plucks conveyor.

An operator can now easily cut through the connection between the plucks and the intestines. The intestines are moved in their pan to the gut cleaning station, while the plucks with leaf fat and diaphragm are moved on for veterinary inspection.

Instead of cutting through the trachea and esophagus at the work station, the carcass can be conveyed to a station for manual processing, including cutting out the tongue, extraction of the plucks and suspension of the plucks on the plucks conveyor, and division of the intestines and plucks. Another possibility is to cut through the trachea at the level of the lungs. After suspension of the liver plucks on the plucks conveyor the liver plucks and intestines can be separated. The tongue plucks can be cut free from the carcass by cutting out the tongue and are hung alongside the associated liver plucks on the same plucks conveyor.

The carcass can now continue to the usual work stations for splitting and division into cuts.

By means of the above working procedures it is possible to remove the set of organs from a pig carcass semi or fully automatically. This saves manpower and avoids heavy and repetitious manual work. None of the known processes have been able to achieve this. Removing the intestine and plucks as a connected piece and not separating them until they are outside the carcass prevents contamination of the carcass and plucks, particularly by the stomach contents. The device is preferably designed to follow the slaughter line speed, which will normally be 320 to 400 pigs per hour or more.

The procedure is particularly flexible as it gives the opportunity to choose whether upstream and downstream operations shall be manual or automatic.

During the operations mentioned above in the work station, the carcass is brought to a standstill, but it is possible to design a work station such that the tools follow the carcass, performing their work as the carcass is conveyed along the slaughter line.

EXAMPLE 3
Level Measuring Device

This example describes the design of an equipment for measuring the distance between the overhead conveyor of the slaughterline and an anatomical point on the carcass.

Figure 5:
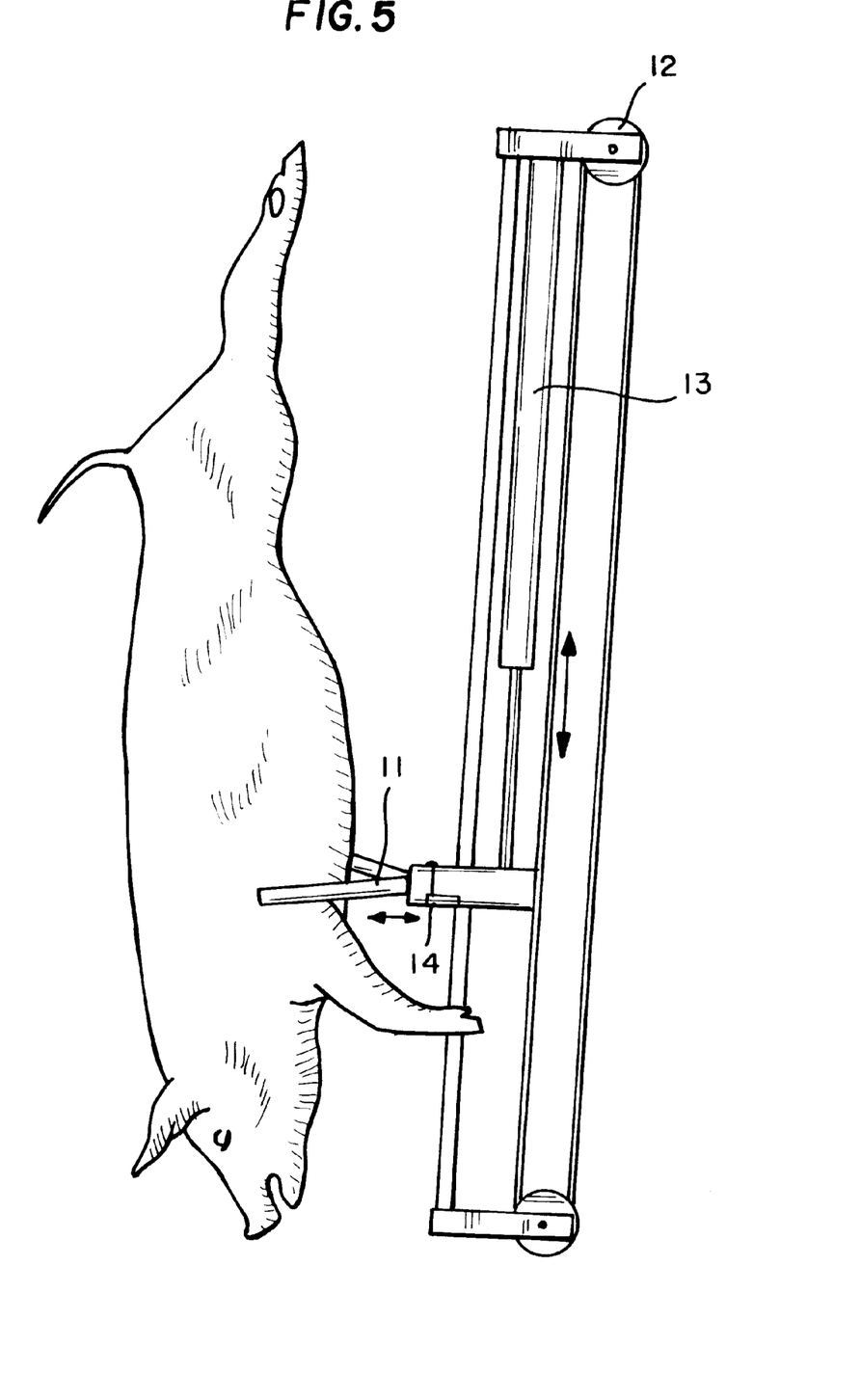
FIG. 5 shows a device for the automatic measurement of the level of the armpits of a carcass in a measuring station.

The level of the diaphragm and the organs in relation to the overhead conveyor varies from carcass to carcass, and this may affect the insertion of the various tools into the carcass and their functioning. In front of the work station there is preferably a measuring station for determination of the position of the diaphragm in proportion to a fixed point (the gambrel or the conveyor rail of the slaughter line). The equipment of the measuring station may—as shown in FIG. 5—comprise two interangular, horizontal sensor arms 11. The arms are connected with a position indicator 12, whose signal is expressive of the current position of the arms. By means of a drive cylinder 13 the arms are moved down along the suspended carcass, and when the arms catch the holes of the carcass at the fore legs ("armpits"), they trigger a switch 14, starting a cycle of registration and computing based on the actual signal of the position indicator. The arms may be hinged, so that they will swing upwards when they are affected by a certain upwards directed force. By this design, damage to the carcass is avoided and the measuring becomes more accurate.

Based on the registrered signal of the position indicator the actual position of, for instance, the diaphragm can be computed automatically with good accuracy. When the carcass is to be processed in a following work station, the height of one or more tools is set in dependence on the measured/computed level of, for instance, th e diaphragm.

To avoid interference with the rear legs and abdominal surface of the carcass the measuring arms are preferably so suspended that they can be moved between an active position against the carcass and an inactive position away from the carcass, e.g. by enabling the arms to swing back from the carcass.

EXAMPLE 4
Behind Cutter

This example describes an embodiment of a tool for cutting through the connections of the intestines to the spinal column of a carcass.

The tool (FIG. 6), which has a shape like a pair of tongs, comprises two legs 21, 22, which are connected by means of an intermediate piece 23. In this piece there are two pins 24 which go through the legs, which can pivot on the pins. In one end of the legs there is a pair of jaws 25, which jaws in the closed position are joined, as illustrated, cutting off the room under the intermediate piece.

Figure 6:
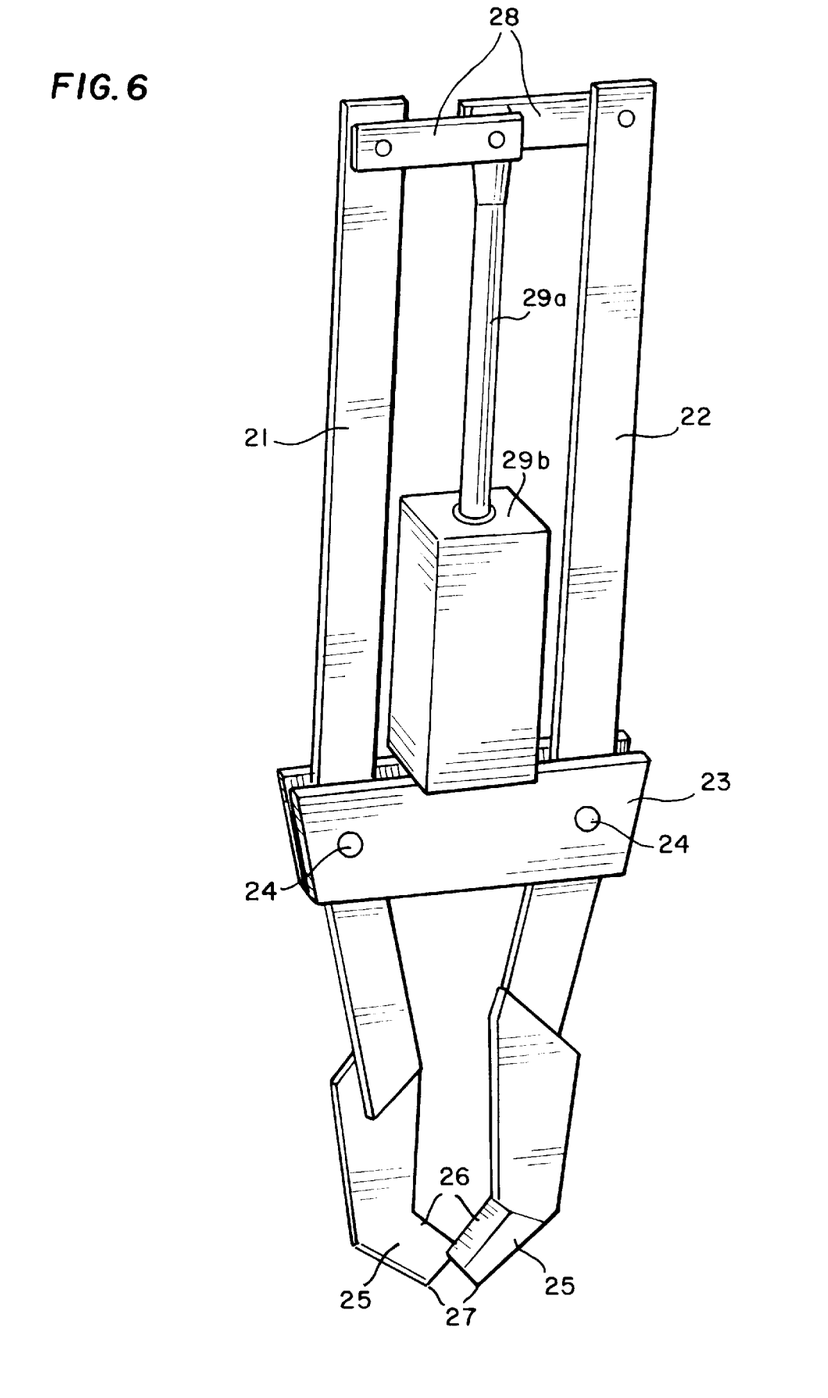
FIG. 6 shows a tool for cutting through the connection of the intestines and the plucks with the spinal column in a carcass.

The jaws have a cutting edge 26 on the inside. On the outside they have a point 27, intended to perforate the diaphragm part of a carcass at the spinal column.

At the end opposite the jaws 25 each of the legs 21, 22 is provided with a hinge-section 28, which is pivotally connected with each of the legs and with a joint piston rod 29*a*, belonging in an air cylinder unit 29*b*. The housing of the unit is mounted on the intermediate piece 23. When the piston moves towards the bottom position, the distance between the ends of the legs at the hinge-sections 28 is reduced, so that the jaws 25 move apart and the tongs-like tool is opened.

The tool can be moved automatically between different positions by means of a manipulator or similar with a bracket that holds the tool in the intermediate piece 23.

In this way the tool can be used to cut through automatically the connections of the diaphragm and the intestines with the spinal column in a carcass, e.g. as follows:

After the abdomen of the carcass has been cut open, the fat end has been loosened, the hams have been divided, and the pubic bone has been separated, the tool with open jaws at the front is led into the abdominal gap of the carcass close to the fat end opening. The tool is then moved down along the spinal column, making the jaws 25 and the legs 21, 22 closest to the jaws grip the connections between the intestines and the spinal column, leading these upwards towards the intermediate piece 23.

The position of the diaphragm is pre-determined by means of a level-measuring device which determines the distance from the holes at the albows or fore legs of the carcass ("the armpits") to the lower edge of the gambrel, or a similar level of reference. The downwards movement of the tool continues until the points of the jaws 27 have reached the measured/calculated level for the diaphragm and a sufficient extra distance for them to perforate the diaphragm part at the spinal column.

The jaws 25 of the tool are now closed by activation of the piston of the cylinder unit in upwards direction. By this operation the edges 26 cut in the muscle, etc. of the diaphragm at the spinal column and the tool gathers the connections between the intestines and the spinal column together in the room enclosed by the jaws, the leg-ends closest to the jaws and the intermediate piece.

By means of the manipulator the tool is then moved upwards along the spinal column, by which operation the connections are cut through by the cutting edges 26 of the jaws, releasing the intestines from the spinal column. The tool is extracted from the carcass and then it is ready to repeat the operation on a new carcass.

The cutting of the connection of the diaphragm and intestines with the spinal column is preferably performed before the operation of loosening diaphragm and leaf fat. Preferably, the cutting is made in the same work station as the loosening of diaphragm and leaf fat.

EXAMPLE 5

This example describes a tool for pre-cutting the tenderloin in a carcass and the use of the tool in loosening the diaphragm and leaf fat.

Tool for Pre-cutting Tenderloin

The tool (FIG. 7) comprises a knife 31 and a knife holder 32. Between the knife and the holder is a hydraulic or pneumatic cylinder unit 33. The knife is also attached to the holder by means of a hinge part 34. The cylinder unit 33 serves to swing the knife between a retracted position in a housing or a sheath, indicated by stippled lines in FIG. 7, and an advanced cutting position, in which the unit presses the knife against the spinal column in a yielding fashion, so that the track of the knife is automatically adapted to the profile of the spine.

Figure 7:
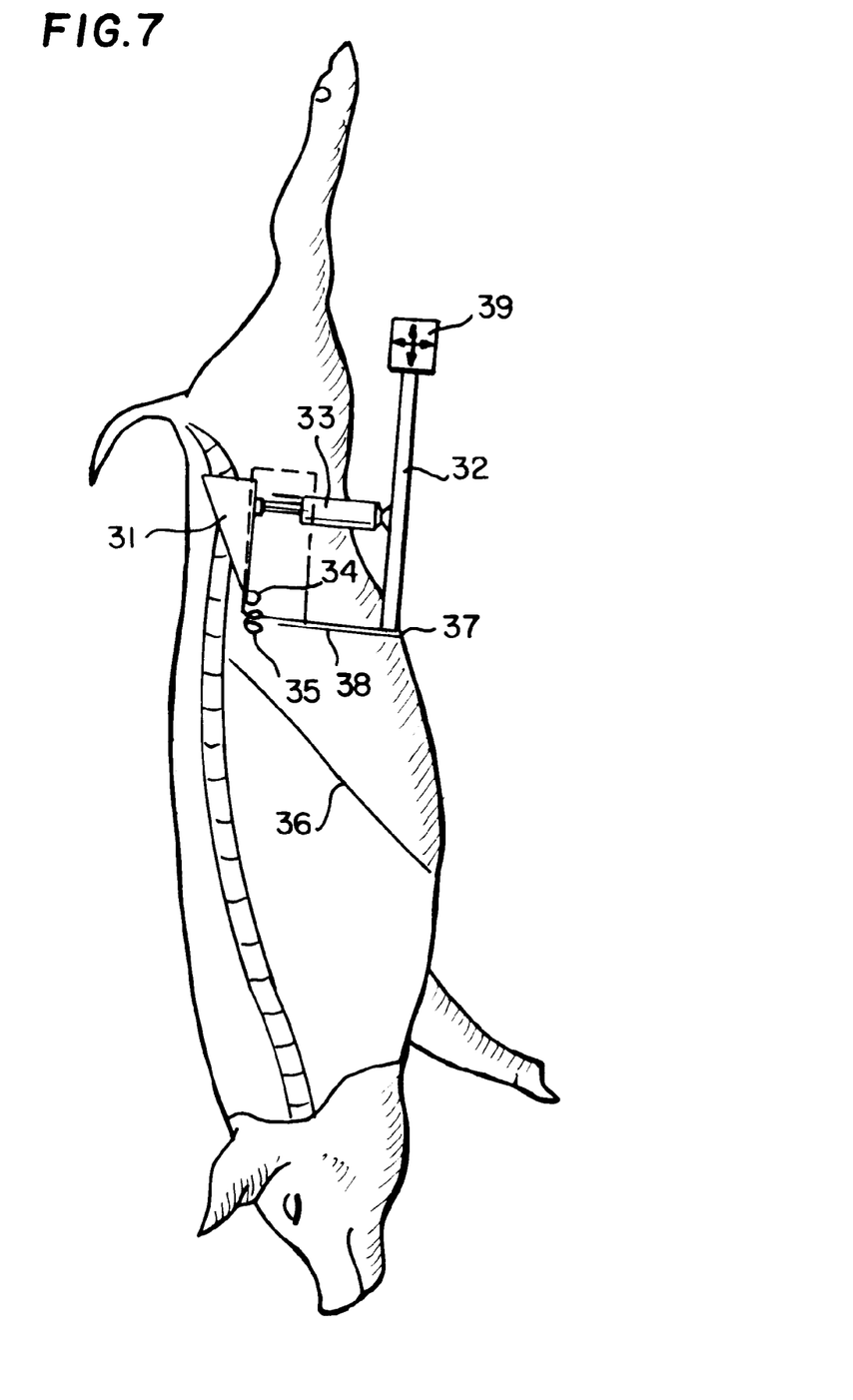
FIG. 7 shows a tool for pre-cutting the tenderloin in a carcass.

The holder 32 has on its underside a stop face 35, which is designed to halt the downwards movement of the tool when the surface meets the diaphragm 36 in the carcass. The holder also has a holding device 37 in the form of a hoop (cf.

Danish design registration no. 63-1981), a plate or other device suitable for use as a holding device. Surface 38 acts as a holding device in loosening the diaphragm and leaf fat. The operation is carried out by means of a loosening tool (FIG. 2) immediately after the tenderloin has been pre-cut by knife 31.

By means of arrangements not shown, the tool in FIG. 7 can be moved in towards and down along the spinal column of the carcass. The arrangements are shown schematically in the form of a box 39. They can move the holder 32 in the directions shown by arrows. The arrangements are so devised that the motion of the tool down along the spinal column will be halted when stop face 35 meets the diaphragm 36 and stretches it.

The holder 32 thus serves three purposes: it is used to move the knife 31 in relation to the carcass, to halt the movement of the knife when the stop face 35 meets the diaphragm after the tenderloin has been pre-cut, and to hold the diaphragm and organs back while the diaphragm and leaf fat are being loosened by means of a hoop device (FIG. 2).

Figure 8:
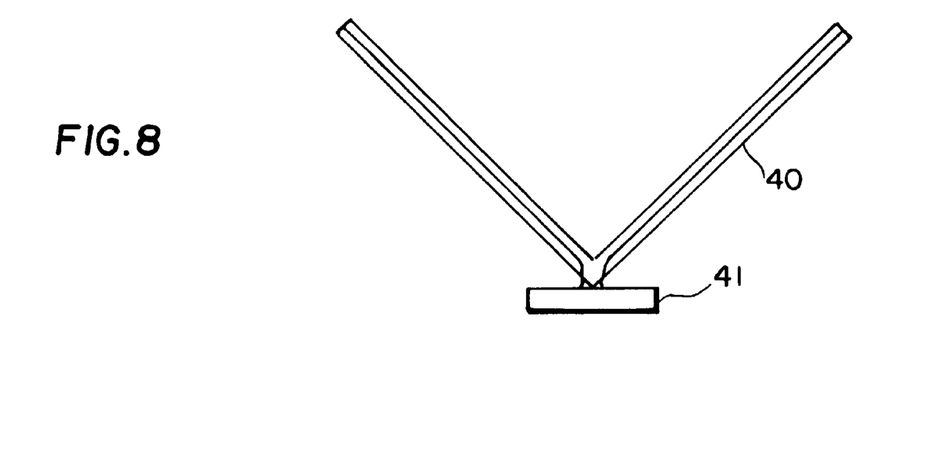
FIG. 8 shows a first embodiment of a knife for use in the tool according to FIG. 7, seen along the blade of the knife.
Figure 9:
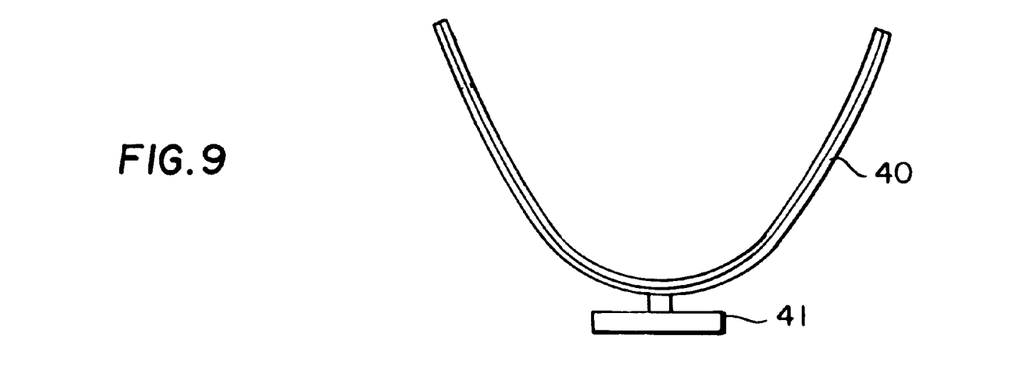
FIG. 9 shows a second embodiment of a knife.
Figure 10:
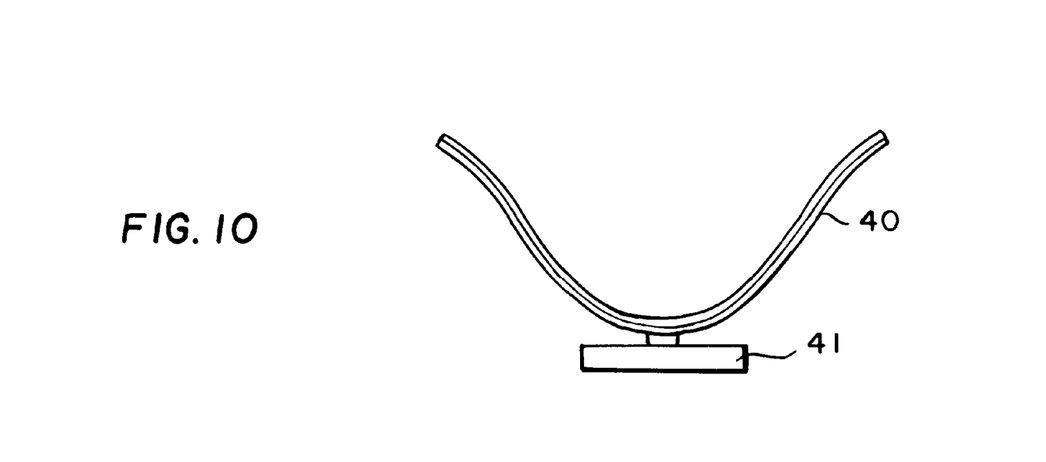
FIG. 10 shows a third embodiment of a knife.

The embodiments shown in FIGS. 8, 9 and 10 of the knife 31 for pre-cutting the tenderloin along the carcass spinal column have a knife blade 40, substantially in the shape of an angled isosceles triangle with a cutting edge along the two sides. The embodiments have different profiles which may be achieved by bending, machining or other known method. Knife 31 is hinged to holder 32 by means of a pin 41 which is mounted on the blade near the point where the cutting edges meet each other.

Evisceration and Pre-cutting of Tenderloin

The process is carried out in substantially the same way as described in example 2 and illustrated in FIG. 1, but tool 5 is of the construction shown in FIG. 7. Below is described only the phase in which the tenderloin is pre-cut and loosening of the diaphragm and leaf fat begins.

After tool 4 (FIG. 1) has cut through the connections of the intestines with the spinal column and has returned to its starting position, the tool of FIG. 7 is inserted against the spinal column of the carcass with knife 31 in advanced position. The knife cuts through the fleshy and connective tissue on two sides of the spinal column and finally comes to rest against the spinal column with a pressure determined by unit 33. While the unit is pressing the knife against the spinal column, the tool is moved downwards in the carcass. By this movement, the knife 31 pre-cuts the tenderloin along the whole of its length. At level T2' (FIG. 1), the knife swings back into its retracted position in the housing or sheath shown by stippled lines in FIG. 7.

The tool of FIG. 7 continues the downwards movement and meets the diaphragm 36 with stop face 35 and then with hoop/plate 37. When the reaction force from the diaphragm and organs has become sufficiently high, the movement stops of its own accord, as the device which carries out the vertical movement is able to exert only a defined vertical force or is designed to stop when the resistance exceeds a threshold value. The tool has now reached level T2 of FIG. 1, immediately above the level of half-hoops 6, after which the loosening of the diaphragm/leaf fat can be started by activating the knives with forwards and backwards motion in the half-hoops 6. The remainder of the working processes can be performed as described in connection with FIG. 1.

After the carcass has been cooled, an operator can easily pull out the pre-cut tenderloin.

EXAMPLE 6

Knife for Trachea and Esophagus

This example describes a tool for cutting through and extracting the trachea and oesophagus in a carcass.

Figure 11:
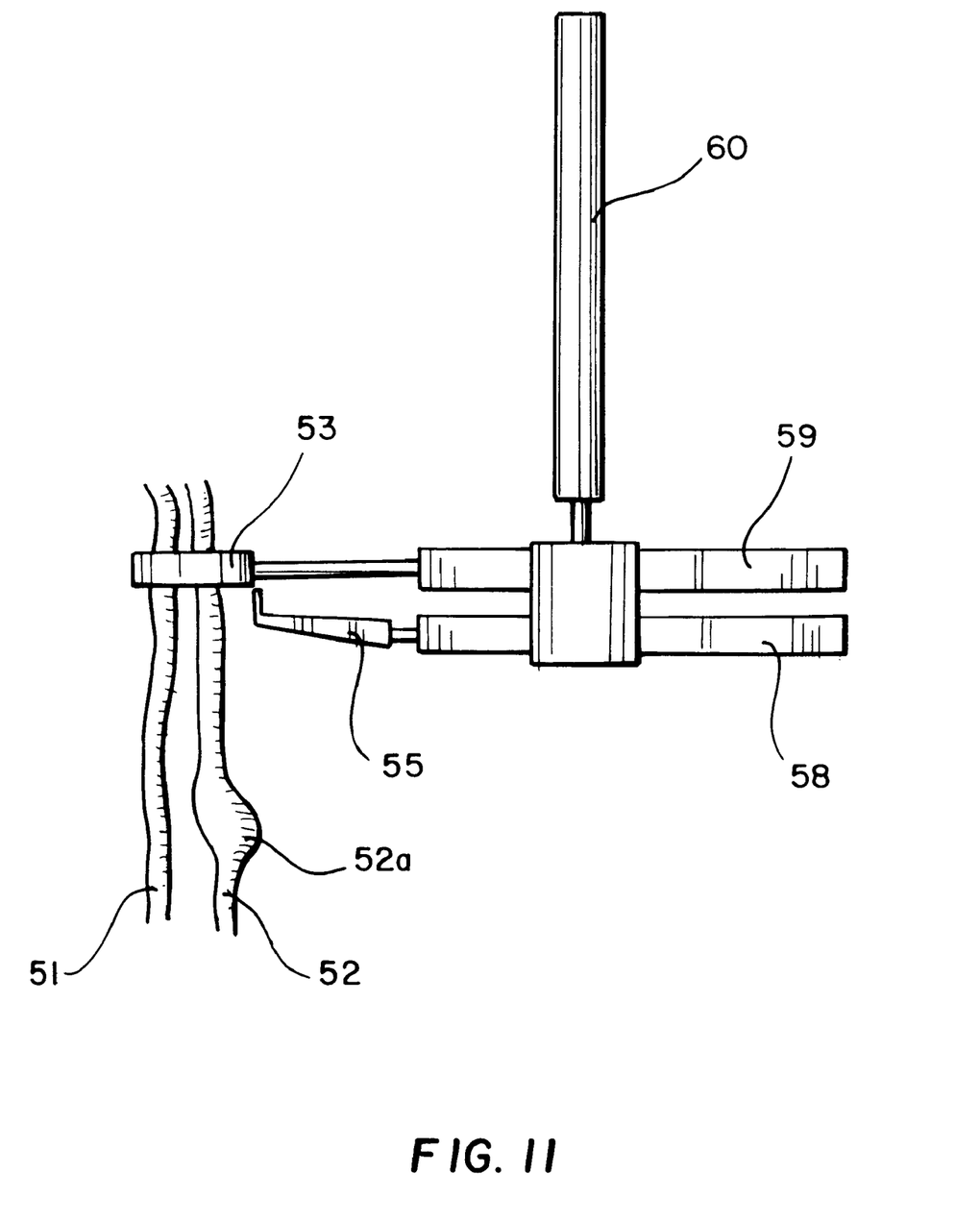
FIG. 11 shows a tool for cutting through the trachea and oesophagus of a carcass.

FIG. 11 shows the tool holding the esophagus 51 and trachea 52 of a carcass which has been cut open in the abdomen and breast (including neck), and which hangs by its rear legs from a gambrel which can be moved along the rail of a slaughter line. The tubes are held by a pair of jaws 53 in a gripper shown in FIG. 12. As can be seen from this figure there is sufficient space in the area between the closed jaws for the esophagus 51 and the trachea 52 not to be squeezed together. The jaws can be opened and closed by means of a pneumatic or hydraulic cylinder unit 54 which actuates the arms on which the jaws are fixed.

Figure 13:
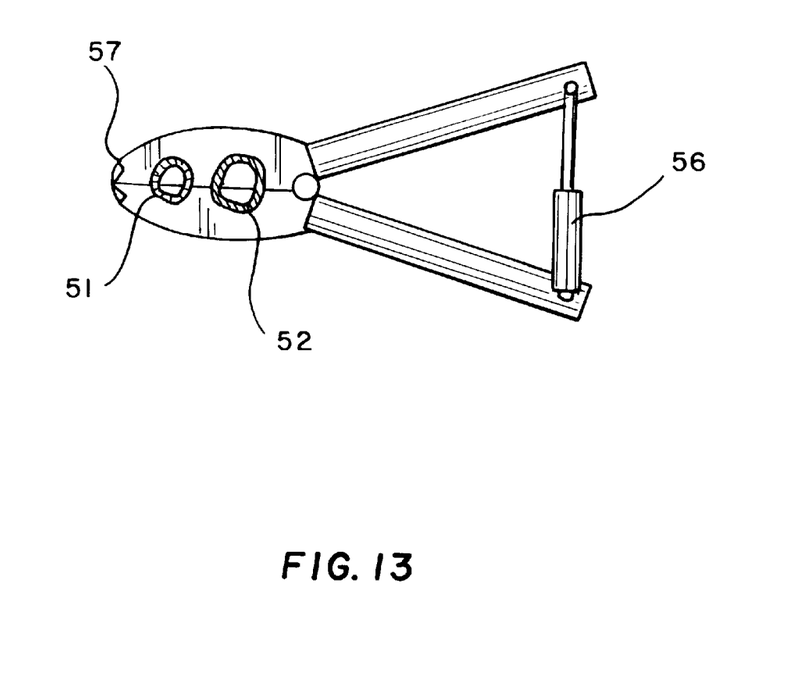
FIG. 13 shows a cutting device in the same tool.

Under jaws 53 is a cutting device with a pair of cutting blades 55 (FIG. 11). They are in the form of the cutting device shown in FIG. 13 designed to cut through the oesophagus 51 and trachea 52, and can perform a cutting movement by means of a pneumatic or hydraulic cylinder unit 56, which is arranged between the two arms on which the blades are fixed. At the end of each blade is a right-angled bending 57, which is arranged to cut through the connective tissue at the rear of the esophagus.

The gripper and cutting device shown schematically in FIG. 11 as a pair of jaws 53 and a pair of blades 55, are mounted on the ends of the piston rods of two pneumatic or hydraulic cylinder units 58, 59. By means of these units the pair of jaws 53 and the pair of blades 55 can thus be moved independently of each other in a mainly horizontal direction towards the trachea and esophagus of a carcass.

Units 58 and 59 are fixed in a common bracket which is mounted on the end of a piston rod of a mainly vertical cylinder unit 60, which may be pneumatic or hydraulic. The pair of jaws 53 and the pair of blades 55 can thus be moved together in a mainly vertical direction down along the trachea and esophagus in a carcass.

The common bracket for units 58 and 59 has a contact or stop face (not shown) which halts the mainly vertical downwards movement when the face meets the underside of the carcass head or similar.

In the following description of the function of the tool in connection with the removal of organs from a carcass, it is assumed that intestines and organs have largely been loosened from the inside of the carcass before the cutting operation begins, but the operation may also begin before all the loosening operations have been carried out or even before any loosening operations have been effected.

At the starting position, cylinder units 58 and 59 with the tools are in an upper position with the piston rod of unit 60 retracted into the units housing, cf. FIG. 11. Likewise, the piston rods of the units 58, 59 are retracted into their cylinder housing, and thus the tools are in inactive position.

The first stage in the cutting operation is that the equipment and the carcass are brought into position in relation to each other (if this has not already been done in a previous working process), so that the trachea and esophagus are lying mainly in the vertical plane of the cylinder units 58, 59 and 60.

Figure 12:
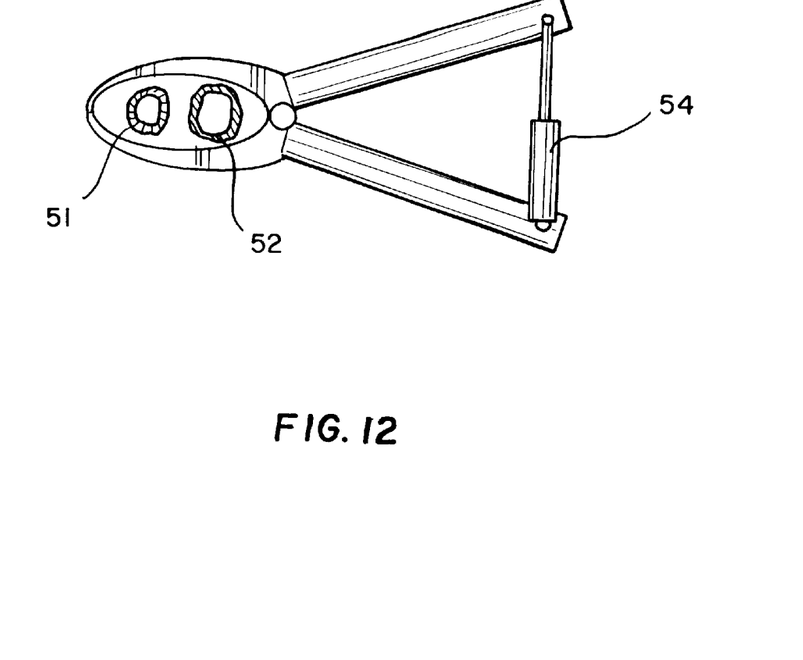
FIG. 12 shows a gripper in the tool according to FIG. 11.

By means of the cylinder unit 54 the pair of jaws 53 is caused to open and the jaws are moved into the breast opening of the carcass by the activation of unit 59. Once the jaws are in the position shown in FIG. 11, the movement stops automatically and the jaws close to enclose the tubes, but not such as to squeeze them (FIG. 12).

Unit 60 is next activated, so that the holding and cutting tools are moved down towards the carcass head. With this movement the pair of jaws slides down the pipes tearing the connecting tissue which holds the pipes in the carcass breast and neck region.

The movement downwards stops when the stop face on the bracket meets the underside of the carcass head. In the stop position the pair of jaws has reached the larynx 52a on trachea 52 and has possibly stretched the tube slightly, as the larynx is too large to pass through the opening between the jaws in their closed state.

The pair of blades 55 in the cutting device is opened by the activation of the cylinder unit 56. The blades are then moved by unit 59 into the carcass breast/neck opening, so that they are placed on either side of larynx 52a and the corresponding part of the esophagus at the larynx. Unit 56 is activated so that the blades close and cut through the larynx (approximately through the centre) and esophagus. The bending 57 on the blades cuts through the connective tissue behind the esophagus.

The cutting device opens again and is retracted from the carcass opening by means of unit 58, so that the tool resumes its rear, inactive position.

The gripper with pair of jaws 53 is retracted by means of unit 59 from the carcass opening to a position adjacent to plucks conveyor conveying plucks hooks. The mutual position of the pair of jaws 53 and the conveyor is such that the trachea and oesophagus are suspended in the path of the hooks being conveyed. The trachea and esophagus and the attached organs (plucks, intestines, etc.) are therefore caught by the hook, and when the pair of jaws 53 subsequently opens automatically, the trachea and esophagus and attached organs pass over to the hook and are moved on by this, thereby completely pulling the organs out of the carcass (with the intestines resting on the gut pan or conveyor). The intestines and plucks can then be separated. By means of the plucks conveyor, the plucks can be transported to other work stations for further processing. The intestines are moved away by the gut pan system or other conveyor.

The apparatus is brought back to its initial position and is then ready to repeat the cutting operation on a new carcass.

The apparatus may be placed in a work station for removal of organs.

EXAMPLE 7

Evisceration Plant

Figure 14:
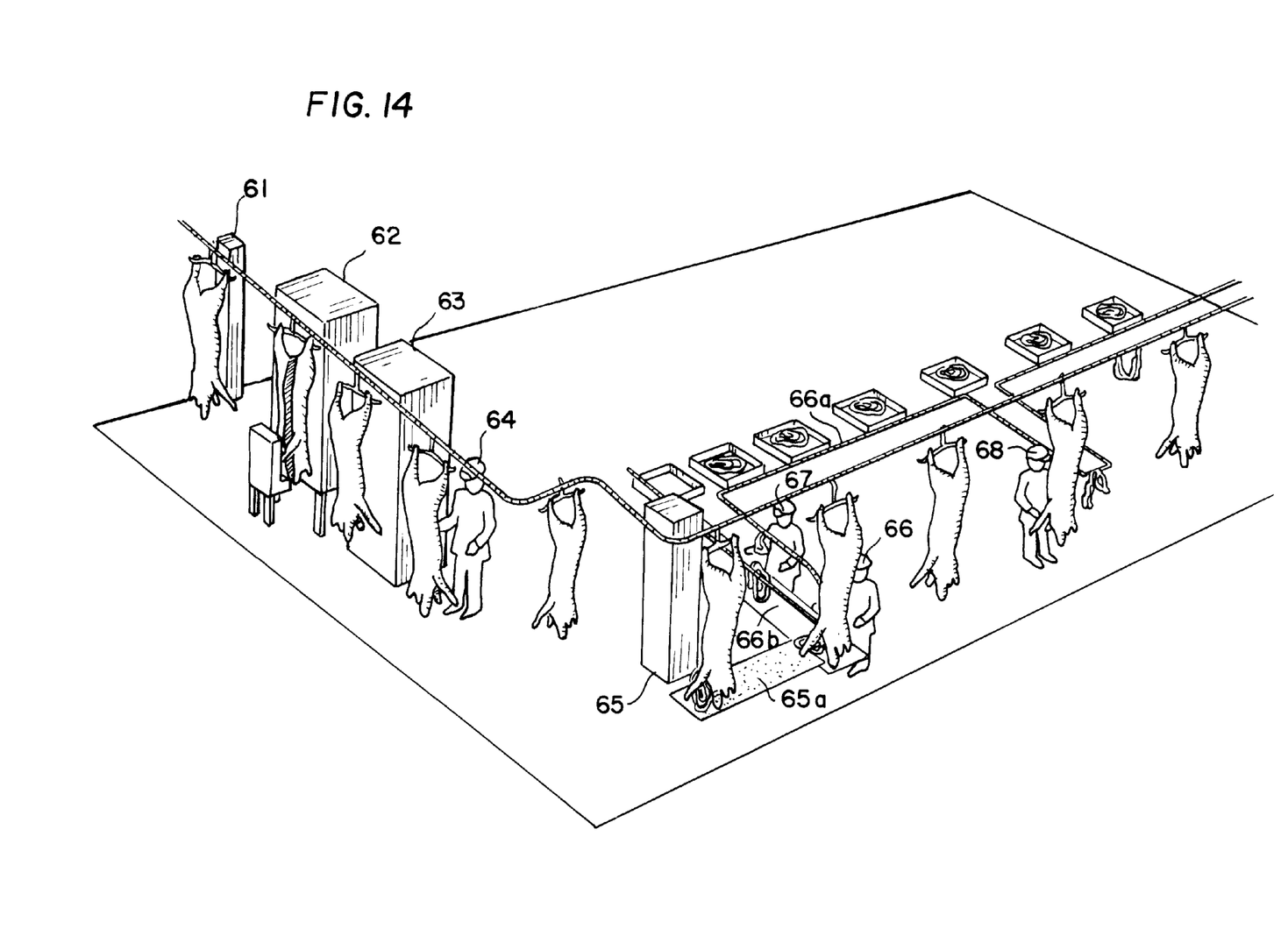
FIG. 14 shows an embodiment of a plant for evisceration of pig carcasses.

This example describes a semi-automatic plant for opening the breast and abdomen of carcasses and removing the organs. The plant comprises several mechanical or manual work stations arranged along a slaughter line conveyor, as shown in FIG. 14.

The first station is an automatic measuring station 61, which measures the level of the hollows of the fore legs/fore trotters of the individual carcass. The measuring apparatus may be of the design described in example 3. The measuring result is saved in the memory of a computer which controls the plant and ensures that the identity of the carcass (e.g. slaughtering number) is followed throughout the whole plant. For this purpose, automatic reading devices may be installed at various locations on the slaughter line to read off a code from the gambrel and thus identify the passing carcass.

The level measure is subsequently used for setting the level of the hoop device before insertion in the carcass below the diaphragm.

The next station 62 comprises a well-tried apparatus for the automatic loosening of the fat end and the separation of the hams.

After this station follows a station 63 for automatic opening of the abdomen and breast, likewise of a well-tried design.

An operator 64 monitors the automatic equipments and puts a plastic bag on the fat end to avoid contamination of the carcass with feces.

The carcass is next led to an automatic station 65 at which the connections of the intestines with the spinal column are cut through and the diaphragm and leaf fat loosened. The station apparatus may for example be constructed as described in example 2. The station may also include the apparatus described in example 5 for pre-cutting the tenderloin.

The station operates such that the connections of the intestines with the spinal column are first cut through, after which the diaphragm is loosened by means of the hoop device and the holding device working in concert with the hoop device. The hoop device is moved up between the hams of the carcass so that the leaf fat and kidneys are loosened from the inside of the carcass. The holding device is moved downwards towards the carcass head, whereby the lungs etc. are pulled free from the inside of the carcass. In the process, the intestines fall down and rest on a conveyor belt 65a. The intestines are still attached to the plucks, which in the main are only connected to the carcass by the trachea and esophagus in the tongue area.

When processing is complete and the carcass is moved out of the station, conveyor belt 65a ensures that the intestines follow the movement of the carcass.

An operator 66 at the end of the belt cuts through the esophagus etc. between the lungs and the diaphragm and suspends the liver plucks and intestines from a hook device transported by a plucks conveyor 66a, the diaphragm being penetrated by the point of the hook. The operator 66 also monitors the automatic processing in station 65.

The set of organs is moved by plucks conveyor 66a and a transverse conveyor belt 66b to another operator 67 who cuts through the connection between the liver plucks and the intestines. The intestines (intestines with spleen, pancreas and stomach) fall down onto belt 66b and are moved by this to a gut pan. The pan is moved away to a veterinary inspection area.

The liver plucks (liver, diaphragm, leaf fat) are moved along the plucks conveyor line to an operator station 68, situated downstream of station 66 on the slaughter line. At station 68 the operator removes the tongue plucks by cutting out the tongue. The tongue plucks are suspended on the hook device with the liver plucks. The device is forwarded by the plucks conveyor at a speed which ensures that the liver plucks and tongue plucks are from the same carcass.

After removal of the tongue plucks the two sets of plucks are moved on by the plucks conveyor for inspection and further processing. The carcass is moved on by the slaughter line for inspection and the usual processing. As shown in FIG. 14, the carcass, plucks and intestines follow each other part of the way so that the veterinary inspector can identify which intestines and plucks have been taken from which carcass.

What is claimed is:

1. Method for evisceration of carcasses conveyed on a slaughter line suspended in gambrels or hooks, where the abdomen and breast have been cut open, the hams divided and the fat end loosened, and wherein the intestines of the carcass are loosened, removed and placed on a gut pan or conveyor, the diaphragm is loosened and the plucks are removed and placed on a plucs conveyor, comprising the steps of breaking the connections between the intestines and spinal column so that the intestines are made to hang out of the abdominal cavity, and mechanically loosening the diaphragm and leaf fat while the intestines are hanging out of the abdominal cavity and are connected to the plucs, said loosening being effected by means of a pressing device (5) and a hoop device (6) which can be moved independently of each other in the lengthways direction of the carcass.

2. Method according to claim 1, and the subsequent steps of free cutting from the carcass and removing the intestines and at least a part of the plucs connected to the intestines in one piece.

3. Method according to claim 2, wherein said step of cutting free is effected by cutting through the trachea and esophagus, cutting free the tongue, or cutting through the connection between the liver plucks and the tongue plucks.

4. Method according to claim 1, and wherein the intestines, when being removed, are supported by a gut pan or conveyor placed under the carcass abdomen.

5. Method according to claim 1, and removing the intestines from the carcass onto a gut pan or belt conveyor while maintaining their connection with the plucs, and separating the intestines and at least one part of the plucks connected to the intestines when the connection between the plucks and the intestines is outside the carcass.

6. Method according to claim 1, and wherein the hoop device (6) has in working position a gap (G) at the breast opening of such a size as to allow the passage of protruding intestines.

7. Method according to claim 1, and wherein the position of the hollows of the carcass fore legs/fore trotters is measured automatically, and that one or more tools are automatically placed in their initial positions and/or work positions on the basis of this measurement.

8. Method according to claim 7, wherein the hoop device (6) is positioned in dependence on this measurement before being inserted into the carcass.

9. Method according to claim 1, and wherein a pan (2) lifts the protruding intestines away from the breast opening before the hoop device (6) is inserted into the carcass under the diaphragm.

10. Method according to claim 1, and wherein said step of breaking the connections of the intestines and diaphragm with the spinal column is by means of a tool (4) moving along the spinal column.

11. Method according to claim 1, and the step of pre-cutting the tenderloin by means of a profiled knife moving along the spinal column.

12. Device for eviscerating carcasses conveyed on a slaughter line suspended from gambrels or hooks, where the abdomen and breast have been cut open, the hams divided and the fat end loosened, comprising in combination a first tool (4) arranged to break the connections between the intestines and the spinal column, so that the intestines are made to hang out of the abdominal cavity, and a second tool arranged to loosen the diaphragm and leaf fat while the intestines are hanging out of the carcass and are connected to the plucks, said second tool respectively comprising a pressing device (5) and a hoop device (6) which can be moved independently of each other in the lengthways direction of the carcass.

13. Device according to claim 12, wherein said hoop device (6) in its working position has a gap (G) at the breast opening of such a size as to permit the passage of protruding intestines.

14. Device according to claim 12, and a lifting device with a pan (2) designed to lift the protruding intestines away from the breast opening before said hoop device (6) is inserted into the carcass below the diaphragm.

\* \* \* \* \*